(12) United States Patent
Azizi et al.

(10) Patent No.: US 10,772,159 B2
(45) Date of Patent: Sep. 8, 2020

(54) CHANNEL ESTIMATION FOR COORDINATED ACCESS POINT TRANSMISSIONS IN WIRELESS NETWORKS

(71) Applicant: Intel Corporation, Santa Clara, CA (US)

(72) Inventors: Shahrnaz Azizi, Cupertino, CA (US);
Thomas J. Kenney, Portland, OR (US);
Roya Doostnejad, Los Altos, CA (US);
Juan Fang, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 388 days.

(21) Appl. No.: 15/394,353

(22) Filed: Dec. 29, 2016

(65) Prior Publication Data
US 2018/0191546 A1      Jul. 5, 2018

(51) Int. Cl.
*H04W 88/12* (2009.01)
*H04L 25/02* (2006.01)
*H04L 5/00* (2006.01)
*H04J 11/00* (2006.01)

(52) U.S. Cl.
CPC .......... *H04W 88/12* (2013.01); *H04L 5/0035* (2013.01); *H04L 5/0051* (2013.01); *H04L 25/0226* (2013.01); *H04J 11/0053* (2013.01); *H04L 5/0023* (2013.01); *H04L 25/0204* (2013.01)

(58) Field of Classification Search
CPC .... H04W 88/12; H04L 5/0035; H04L 5/0051; H04L 25/0226; H04L 5/0023; H04L 25/0204; H04L 25/0225; H04L 5/0048; H04J 11/0053
See application file for complete search history.

(56) References Cited

U.S. PATENT DOCUMENTS

| | | | |
|---|---|---|---|
| 9,042,484 B2* | 5/2015 | Kang | H04W 99/00 375/299 |
| 9,319,896 B2* | 4/2016 | Liu | H04L 25/0204 |
| 2014/0362840 A1* | 12/2014 | Wong | H04W 88/06 370/338 |
| 2015/0236831 A1* | 8/2015 | Kang | H04L 5/0048 370/338 |
| 2016/0255620 A1* | 9/2016 | Li | H04W 72/1231 370/329 |
| 2016/0365954 A1* | 12/2016 | Lee | H04L 5/005 |
| 2016/0366548 A1* | 12/2016 | Wang | H04W 64/00 |
| 2017/0373808 A1* | 12/2017 | Park | H04L 5/005 |
| 2018/0014216 A1* | 1/2018 | Banerjea | H04W 24/08 |

* cited by examiner

*Primary Examiner* — Shukri Taha
(74) *Attorney, Agent, or Firm* — Eversheds Sutherland (US) LLP

(57) ABSTRACT

This disclosure describes systems, methods, and devices related to channel estimation for coordinated access point (AP) transmissions. A device may identify of one or more access points associated with a coordinated basic service set. The device may determine to transmit one or more packets to a station device in coordination with the one or more access points. The device may determine one or more first training fields associated with one or more antennas of the device. The device may cause to send the one or more first training fields to the station device on one or more first communication links between the device and the station device.

6 Claims, 8 Drawing Sheets

CHANNEL ESTIMATION FOR COORDINATED ACCESS POINT TRANSMISSIONS IN WIRELESS NETWORKS

TECHNICAL FIELD

This disclosure generally relates to systems, methods, and devices for wireless communications and, more particularly, channel estimation for coordinated access point (AP) transmissions.

BACKGROUND

Wireless devices are becoming widely prevalent and are increasingly requesting access to wireless channels. Wireless signals transmitted over these wireless channels are subject to undesirable effects such as attenuation, distortion, and delays. Orthogonal Frequency-Division Multiple Access (OFDMA) training fields may be transmitted to help mitigate these effects.

DETAILED DESCRIPTION

Figure 1:
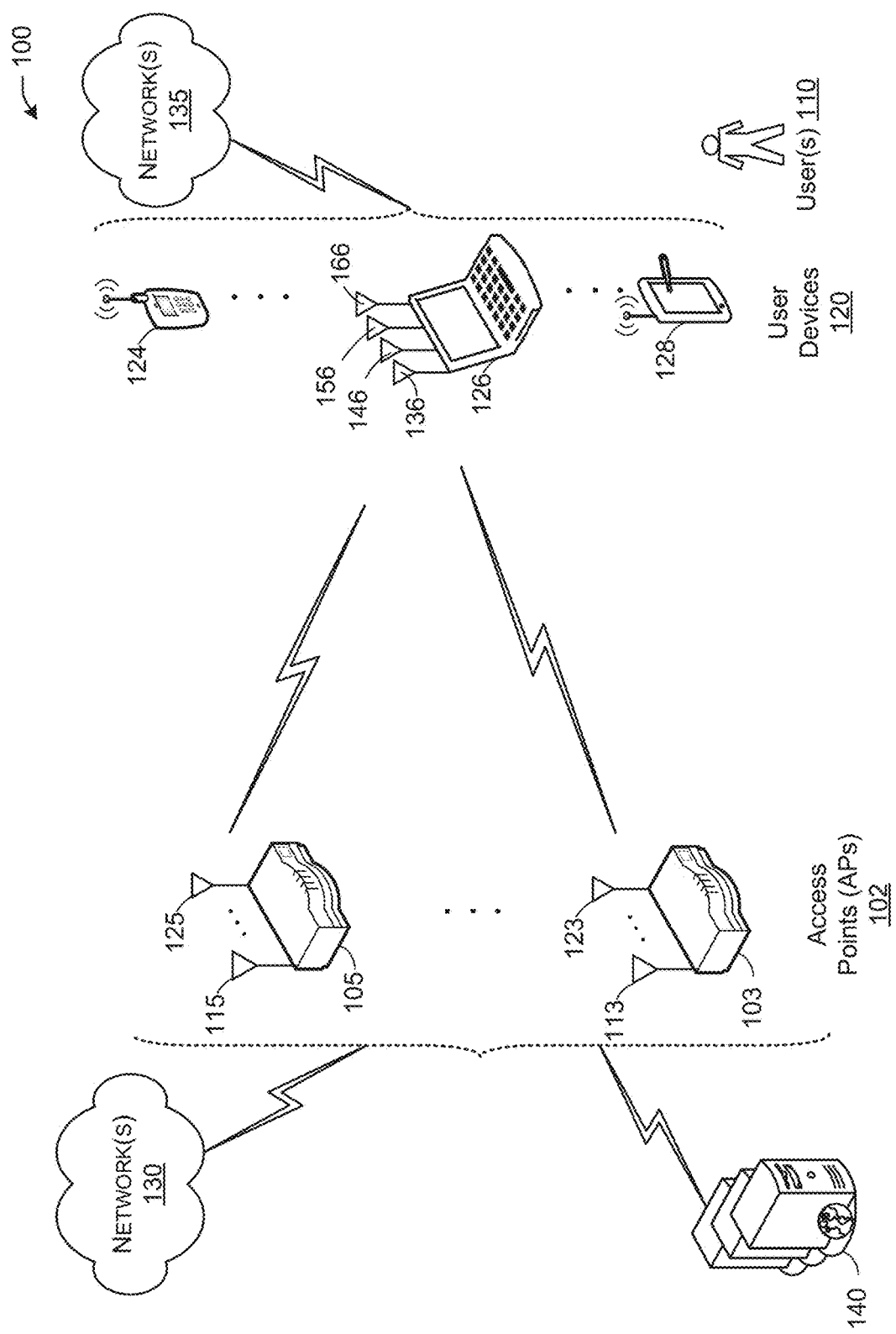
FIG. 1 depicts a diagram illustrating an example network environment of a channel estimation for a coordinated AP transmissions system, in accordance with one or more example embodiments of the present disclosure.

Example embodiments described herein provide certain systems, methods, and devices for providing signaling information to Wi-Fi devices in various Wi-Fi networks.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In the past two decades, the IEEE 802.11 WLAN networks have experienced tremendous growth with the proliferation of Wi-Fi devices, as a major Internet access scheme for mobile computing and electronic devices. Since the early deployment of IEEE 802.11 devices in both enterprise and public networks, there have only been proprietary solutions to provide coordination among access points (APs). However, such coordination is transparent to client devices, meaning that a client device, also called a station (STA), establishes a physical layer connection with only one AP at a time. That is, the STA is able to communicate with only one AP at a time for a particular communication session.

During communication between two devices (e.g., AP(s) and STA(s)), one or more frames may be sent and received. These frames may include one or more fields (or symbols) that may be based on an IEEE 802.11 standard.

Example embodiments of the present disclosure relate to systems, methods, and devices to enable channel estimation for coordinated AP transmission and Wi-Fi networks.

A managed Wi-Fi network refers to a deployment scenario in a large area such as an enterprise, a school campus, a hotel, an airport, a stadium, etc., where several APs form an extended service set (ESS) using the same SSID, and have either a centralized or distributed control layer among them.

In one embodiment, a channel estimation for a coordinated AP transmissions system may facilitate an STA to stagger the communications and separate them in time, frequency, and code in order for the STA to be able to simultaneously communicate with multiple APs at a time.

In one embodiment, a coordinated basic service set (C-BSS) communication may be defined as a set of managed BSS networks. The C-BSS may provide a range of different techniques that enable the dynamic coordination of transmission and reception over a variety of different APs. The aim is to improve the overall quality for each STA within the network as well as improving the utilization of the network. Essentially, the C-BSS may manage inter-BSS transmissions and thereby convert an interfering signal into a useful one, especially at the boundary of the BSS's coverage areas (cell edge) where performance may be degraded. To enable C-BSS, dynamic physical layer (or link layer) communication has to be established among STAs and APs, which requires wireless channel state information to be obtained at each node, and to be exchanged among nodes in a fast manner.

In one embodiment, a channel estimation for a coordinated AP transmissions system may obtain channel state estimations of the different transmission links required to enable C-BSS with multiple APs. In that case, APs may jointly transmit a multiple-input multiple-output (MIMO) packet to an STA. In order to do so, the STA may obtain a channel matrix of all the corresponding links with the various APs within the C-BSS. For example, if an STA is within the coverage areas of multiple APs, these APs may jointly transmit data to the STA. Depending on the scenario (network load, transmission scheme, STA location, etc.), the STA may need to obtain channel state information for each link to each AP in order to receive information reliably.

In one embodiment, a channel estimation for a coordinated AP transmissions system may use a central or distributed backhaul controller, which enables exchanges of information among each AP in the network related to their management, control, and data plans.

In one embodiment, a channel estimation for a coordinated AP transmissions system may be obtained through use of long training fields (LTFs), which may be orthogonal to other LTFs from different APs during a cooperative transmission. This may allow an STA to perform channel state estimation for all spatial streams. An LTF may be a field utilized for channel estimation, channel training, channel characterization, and other functions needed for establishing a channel between a transmitting device and a receiving device. The format of an LTF may depend on the communication network and the devices used in a network. For example, in an uplink (UL) multi-user (MU)-MIMO, a specific LTF sequence may be adopted such that receiving devices are able to be trained using this LTF sequence. In another example for DL-C-BSS transmission, another LTF sequence may be used by APs. Channel estimation provides channel state information (CSI) at the receiving device (e.g., STA) for coherent detection of the transmitted information in wireless communication systems. CSI refers to known channel properties of a communication link. This information describes how a signal propagates from the transmitting device to the receiving device and represents the combined effect of, for example, scattering, fading, and power decay with distance, and delay spread and multipath characteristics of the channel. The CSI can make it possible to adapt transmissions to current channel conditions, and channel estimates at the receiver allow equalization of the received signal to compensate channel effects.

In one embodiment, a channel estimation for a coordinated AP transmissions system may use an overlay matrix in order to enable channel estimation at the STA. The use of an overlay matrix may have the advantage of simplifying hardware architecture and implementation through reuse.

In one embodiment, a channel estimation for a coordinated AP transmissions system may interleave LTFs in the frequency domain.

In one embodiment, a channel estimation for a coordinated AP transmissions system may be compatible with the IEEE 802.11 packet format and may allow the reuse of 802.11 hardware architecture resulting in lower complexity and latency in the network.

The above descriptions are for purposes of illustration and are not meant to be limiting. Numerous other examples, configurations, processes, etc., may exist, some of which are described in detail below. Example embodiments will now be described with reference to the accompanying figures.

FIG. 1 is a diagram illustrating an example network environment of a channel estimation for a coordinated AP transmissions system, in accordance with one or more example embodiments of the present disclosure. Wireless network 100 may include one or more user devices 120 and one or more access point(s) (AP) 102, which may communicate in accordance with IEEE 802.11 communication standards. The user device(s) 120 may be mobile devices that are non-stationary (e.g., not having fixed locations) or may be stationary devices. The one or more APs 102 may communicate with each other using a central or distributed backhaul controller (BC) 140, which may enable exchanges of information among each AP in the network related to their management, control, and data plans.

Figure 6:
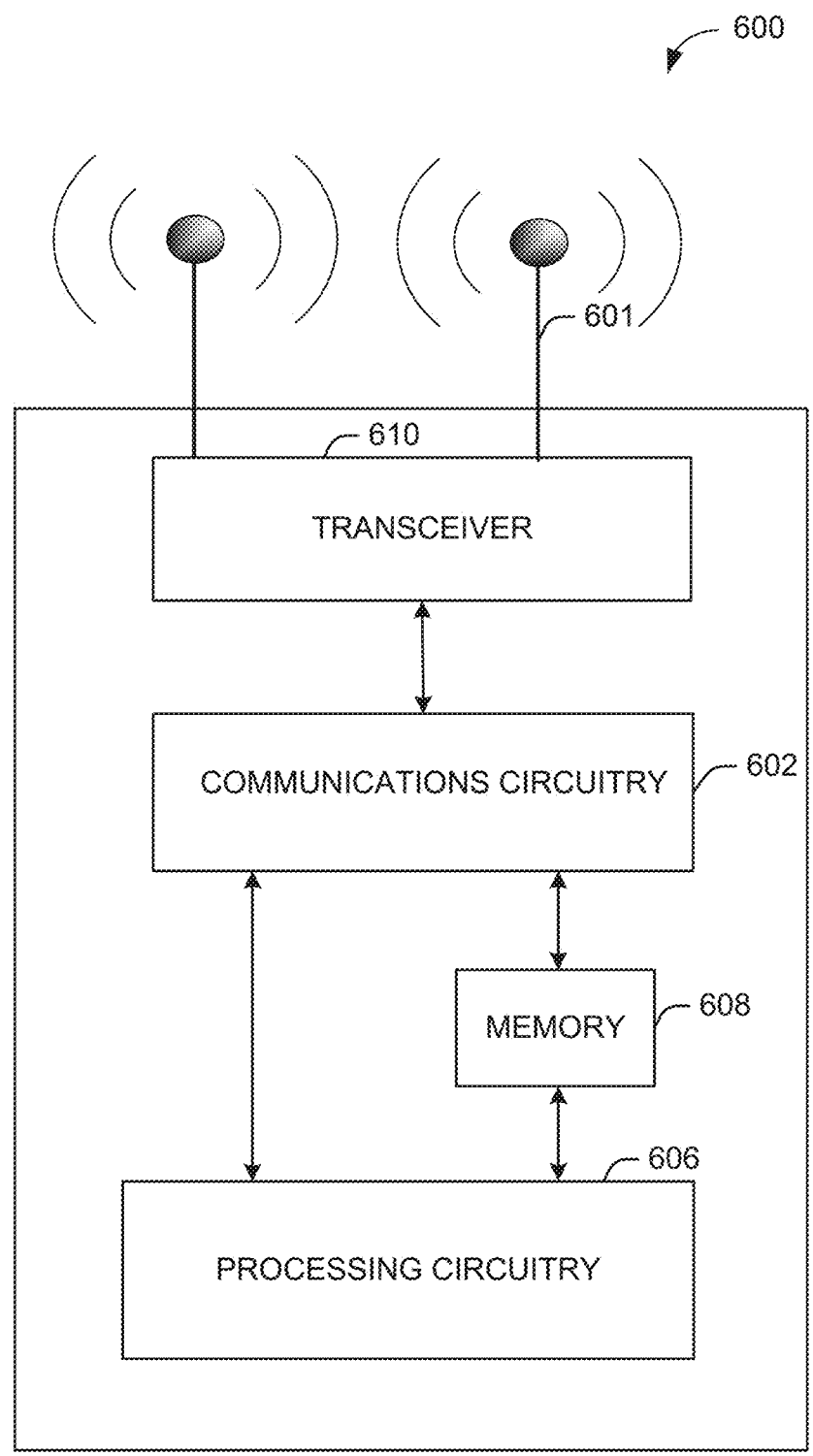
FIG. 6 illustrates a functional diagram of an example communication station that may be suitable for use as a user device, in accordance with one or more example embodiments of the present disclosure.
Figure 7:
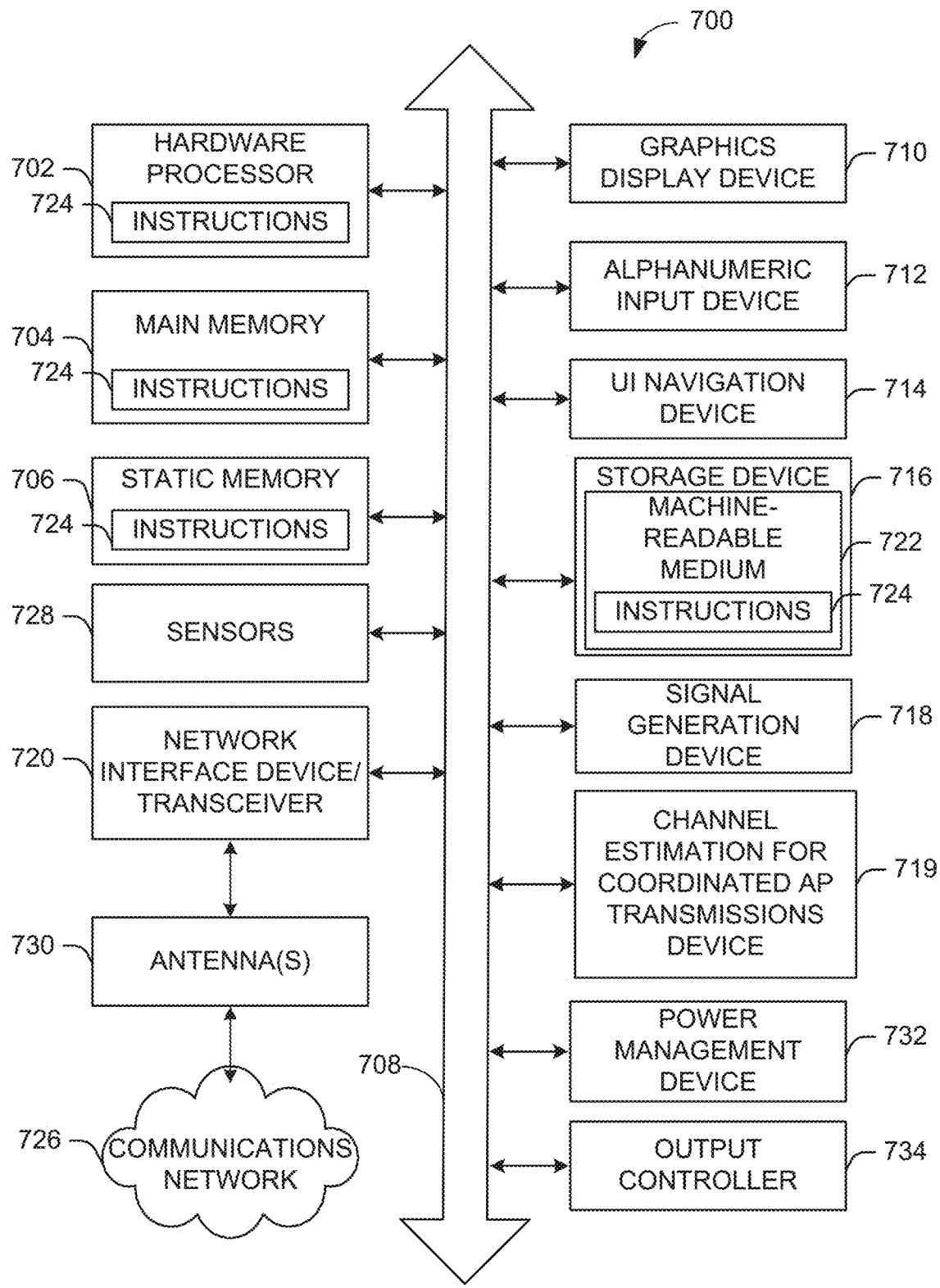
FIG. 7 illustrates a block diagram of an example machine upon which any of one or more techniques (e.g., methods) may be performed, in accordance with one or more example embodiments of the present disclosure.

In some embodiments, the user devices 120, the AP(s) 102, and the BC 140 may include one or more computer systems similar to that of the functional diagram of FIG. 6 and/or the example machine/system of FIG. 7.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static, device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax, etc.), 5 GHz channels (e.g. 802.11n, 802.11ac, 802.11ax, etc.), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

When an AP (e.g., AP(s) 102) establishes communication with one or more user devices 120 (e.g., user devices 124, 126, and/or 128), the AP(s) 102 may communicate in a downlink direction and the user devices 120 may communicate with the AP(s) 102 in an uplink direction by sending frames in either direction. The user devices 120 may also communicate peer-to-peer or directly with each other with or without the AP(s) 102.

In one embodiment, and with reference to FIG. 1, one or more APs 102 (e.g., AP 103 and AP 105) may belong to a C-BSS, which may provide a range of different techniques that enable the dynamic coordination of transmission and reception of packets with an STA using the one or more APs 102.

A user device (e.g., user device 126) may be in communication with one or more APs 102. For example, the user device 126 may communicate with the AP 103 and the AP 105. In a channel estimation for coordinated AP transmissions system, the AP 103 and the AP 105 may be able to exchange information among each other in order to complete a simultaneous communication with the user device 126. The APs may dynamically coordinate the transmission and the reception of data with the user device 126 using the BC 140.

The AP 103 and the AP 105 may include one or more antennas. In this example, the AP 103 is shown to be using antennas 113 and 123 to communicate with the user device 126 that has four antennas (136, 146, 156, and 166). The AP 105 is shown to be using antennas 115 and 125 to communicate with the user device 126.

In an IEEE 802.11 packet, one or more LTFs may provide training for a user device to estimate the channel between each transmit/receive antenna combination.

In one embodiment, a channel estimation for a coordinated AP transmissions system may use an LTF for C-BSS operations (C-BSS-LTF). The C-BSS-LTF may be used to refer to the LTF portion of a packet that carries signaling used for channel estimation for a physical layer convergence protocol data unit (PPDU) that is jointly transmitted from a set of APs that form the C-BSS operation. For example, the APs 103 and 105 may each transmit a C-BSS-LTF field to the user device 126 in order to perform channel estimation for the link between the AP 103 and the user device 126 and the link between the AP 105 and the user device 126. Each of these C-BSS-LTF fields may be differentiated from each other in a code domain. That is, the C-BSS-LTF fields may be orthogonal to each other based on application of an orthogonal matrix in order to achieve the orthogonality between the C-BSS-LTF fields. An orthogonal matrix such as the P-matrix may be applied to the training fields for a given group of user devices, which may result in training fields being separated and being easier to distinguish.

The various embodiments are applicable to a wideband transmission as well as transmission within an OFDMA allocation. The term "subcarriers" refers to either the entire wideband C-BSS-LTF subcarriers or a portion of them that falls in an OFDMA allocation that is used for joint transmissions from APs in a C-BSS set to the STA. With C-BSS, the transmitter (e.g., an antenna) of each AP provides training for its associated $N_{STS,r}$ (number of spatial streams) used for the joint transmission of a PPDU to the STA. For each subcarrier, the MIMO channel that can be estimated is $N_{Rx} \times N_{STS,r} \times N_{AP}$. The $N_{Ap}$ designates the number of APs, the $N_1$ designates the number of receive (RX) antennas on the STA, and the $N_{STS,r}$ designates the number of space-time streams per AP. For example, if there are two APs each having two antennas having two space-time streams, and the STA has four RX antennas, then the STA may need $4 \times 2 \times 2 = 16$ channel estimations. Both antennas are used jointly to transmit and decode two streams. By enabling the STA to determine the channel estimations of all the streams from all the antennas of all the APs, the STA may be able to transmit and receive data using these channel estimations. It is understood that the above descriptions are for purposes of illustration and are not meant to be limiting.

Figure 2:
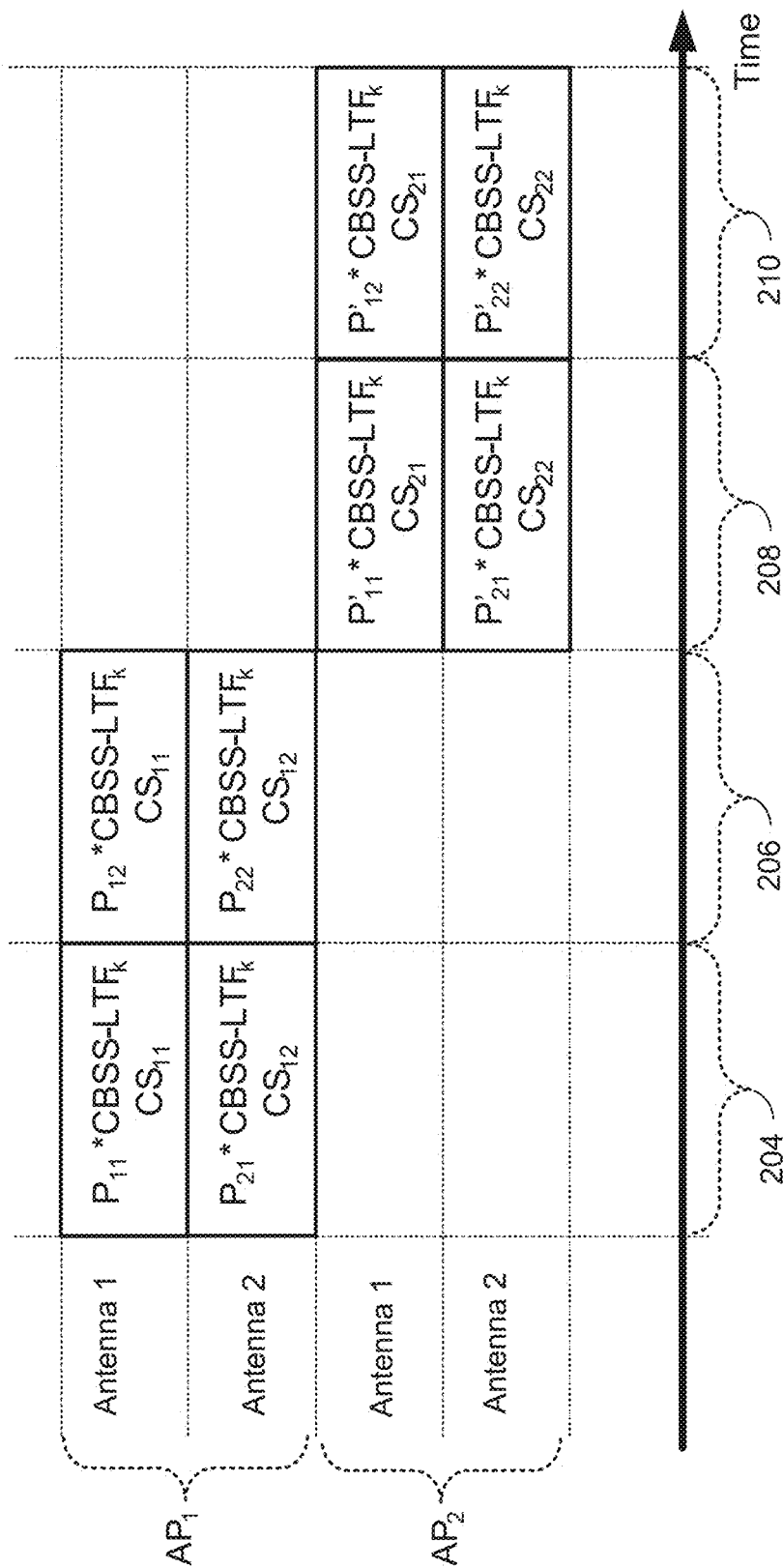
FIG. 2 depicts an illustrative schematic diagram of a channel estimation for a coordinated AP transmissions system using a time domain separation, in accordance with one or more example embodiments of the present disclosure.

FIG. 2 depicts an illustrative schematic diagram of a channel estimation for a coordinated AP transmissions system using a time domain separation, in accordance with one or more example embodiments of the present disclosure.

In one embodiment, a channel estimation for a coordinated AP transmissions system may utilize multiple APs in order to communicate with one STA. Channel estimation for C-BSS may be possible by separating the LTF fields in the time domain in order to minimize the interference between the multiple APs. That is, while the antennas of a first AP are transmitting the LTF fields to the STA, the antennas of a second AP may not transmit the LTF fields to the STA. The time separation may prevent interference between the transmissions from the separate APs.

In one embodiment, a channel estimation for a coordinated AP transmissions system may determine a C-BSS packet transmission. The C-BSS packet may include a preamble that contains C-BSS-LTF symbols. The C-BSS-LTF may refer to the LTF portion of a packet that carries signaling used for channel estimation for a PPDU that is jointly transmitted from a set of APs. The data subcarriers of each C-BSS-LTF symbol are multiplied by the entries of a matrix (e.g., a P-matrix), to enable channel estimation at the receiver (e.g., an STA). The number of C-BSS-LTF symbols is a function of the total number of space-time streams and the total number of APs.

In the example of FIG. 2, a C-BSS is shown to include two APs (e.g., $AP_1$ and $AP_2$) each having two antennas. In this example, an STA with four antennas may need to communicate with the two APs. Each of the antennas of $AP_1$ and $AP_2$ may transmit four spatial streams to the STA. This scenario is similar to the legacy 4×4 MIMO case, where one AP transmits on each antenna four spatial streams to one STA with four antennas. However, using a coordinated system (e.g., C-BSS), the four transmit (TX) antennas may be divided between two APs (e.g., $AP_1$ and $AP_2$) to create a richer full rank multipath channel. Such a scenario is more relevant to the dense deployments where APs with different coverage areas are deployed with one ESS. However, interference may exist if the two APs transmit simultaneously on all their antennas.

In one embodiment, the LTFs may be separated using a time domain separation in order to minimize interference from the antennas transmitting on the one AP and the antennas transmitting on the other AP. For example, $AP_1$ may transmit two LTF fields on its first antenna and two LTF fields on its second antenna using the first two timeslots (e.g., timeslots 204 and 206), while the $AP_2$ may transmit two LTF fields on its first antenna and its second antenna to the STA in next two timeslots (e.g., timeslots 208 and 210). Each timeslot may be used for each LTF from antennas on the respective AP. The $AP_1$ and the $AP_2$ do not transmit on the same timeslots in order to create a time domain separation. Separating the transmissions from the $AP_1$ and the $AP_2$ in the time domain may allow estimating the wireless channels of links to each AP separately.

In one embodiment, a channel estimation for a coordinated AP transmissions system may utilize a P matrices and cyclic shift (CS) diversity in order to orthogonalize the transmissions between the antennas on each AP. CS diversity is a multiplexing technique to transmit a signal from multiple antennas. For example, $AP_1$ may utilize a 2×2 P-matrix P and $AP_2$ may utilize another 2×2 P-matrix P' as follows:

$$P = \begin{bmatrix} P_{11} & P_{12} \\ P_{21} & P_{22} \end{bmatrix} \quad P' = \begin{bmatrix} P'_{11} & P'_{12} \\ P'_{21} & P'_{22} \end{bmatrix}$$

In some embodiments, P and P' may be different or may have the same elements.

The CS values are designated as $CS_{ii}$ and $CS_{12}$ to provide a cyclic shift diversity between antenna 1 and antenna 2 of $AP_1$ when transmitting in the same timeslot (e.g., timeslots 204 and 206). The CS values are designated as $CS_{21}$ and $CS_{22}$ to provide a cyclic shift diversity between antenna 1 and antenna 2 of $AP_2$ when transmitting the same timeslot (e.g., timeslots 208 and 210). It is understood that the above descriptions are for purposes of illustration and are not meant to be limiting.

Figure 3:
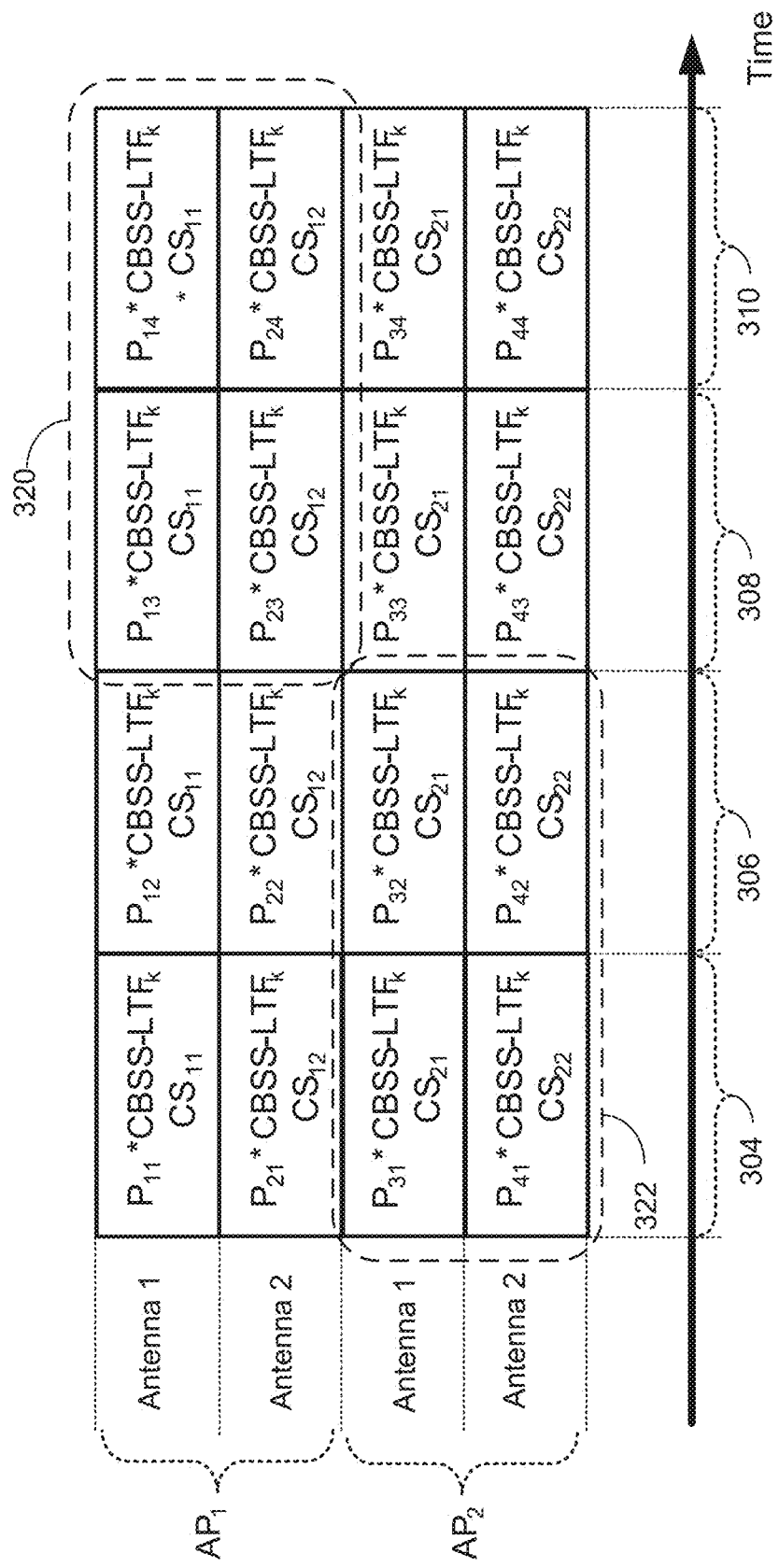
FIG. 3 depicts an illustrative schematic diagram of a channel estimation for a coordinated AP transmissions system using code separation, in accordance with one or more example embodiments of the present disclosure.

FIG. 3 depicts an illustrative schematic diagram of a channel estimation for a coordinated AP transmissions system using code separation, in accordance with one or more example embodiments of the present disclosure.

In one embodiment, a channel estimation for a coordinated AP transmissions system may generate C-BSS-LTF fields to be transmitted simultaneously from two or more APs within the same timeslots. The C-BSS-LTF fields may be separated by applying a combination of a P-matrix and a CS diversity between all streams being transmitted to the STA. Utilizing the combination of the P-matrix and the CS value may allow separation at the receiver between the C-BSS-LTF fields even though they are transmitted from multiple APs in the same timeslot. For example, two spatial streams from each AP are transmitted simultaneously to the STA. Therefore, the STA may determine a 4×4 channel estimation matrix in order to identify the C-BSS-LTF fields received from the two APs. It should be understood that forming a 4×4 matrix is just an example, and the idea is not limited to this as devices can have more antennas, for example 4×8 or even 8×10 (STAs usually do not have many antennas).

In one embodiment, each AP may transmit additional C-BSS-LTF fields on consecutive timeslots. In the example of FIG. 3, $AP_1$ may transmit C-BSS-LTF fields on the first four timeslots on each of its antennas. $AP_2$ may simultaneously transmit C-BSS-LTF fields on the first four timeslots on each of its antennas. Therefore, the STA may form 16 C-BSS-LTF fields that would be used for channel estimation on the STA side. That is, the STA will receive one composite symbol at each time slot, but can form a 4×4 matrix using the samples received at each of its 4 antenna at four time slots.

In one embodiment, a channel estimation for a coordinated AP transmissions system may facilitate the STA to construct a 4×4 channel estimation matrix in order to coherently receive the various C-BSS-LTFs from the multiple APs. In that scenario, the APs may each transmit two additional C-BSS-LTF fields in additional timeslots compared to FIG. 2, where time separation was necessary to mitigate interferences. For example, two additional C-BSS-LTF fields are shown to be transmitted in timeslots 308 and 310 from each of antenna 1 and antenna 2 of $AP_1$. The same is true for $AP_2$, where antenna 1 and antenna 2 each transmit two additional C-BSS-LTF fields in timeslots 304 and 306. This is designated as block 320 for the antennas of $AP_1$ and block 322 for the antennas of $AP_2$. It should be understood that forming a 4×4 matrix is just an example, and the idea is not limited to this as devices can have more antennas, for example 4×8 or even 8×10 (STAs usually do not have many antennas).

In one embodiment, the additional LTF fields may need to be signaled to the STA. It is noted that a field in the SIGNAL field of a preamble may be utilized to indicate to the STA that additional LTF fields are used. Transmissions from different antennas may use different cyclic shifts. CS diversity is a multiplexing technique to transmit a signal from multiple antennas. Since the two APs are geographically separated, they could potentially use the same CS values.

In one embodiment, the C-BSS-LTF transmissions from the APs are made orthogonal by using a 4×4 P-matrix. The structure of the P-matrix itself is defined similarly to IEEE 802.11ac and IEEE 802.11ax. Using a P-matrix allows reuse of IEEE 802.11n/ac/ax hardware architecture and hardware implementation at the cost of transmission of extra LTF symbols.

In the example of FIG. 3, $AP_1$ may send four C-BSS-LTF fields on each antenna on a specific subcarrier (e.g., the carrier k). Each of these four C-BSS-LTF fields for the $k^{th}$ subcarrier is multiplied by the elements of the P-matrix, and a CS may be applied to each of these C-BSS-LTF fields. It should be understood that k indicates the number of the subcarrier that is carrying the C-BSS-LTF field. The number of the subcarriers depends on the frequency band used (e.g., 20, 40, 60, 80 MHz, etc.). Since the environment is an OFDM environment, each subcarrier may be estimated separately. For each subcarrier, the receiver (e.g., STA) may need to estimate a number of channel estimates that is the number of RX antennas of the receiver, multiplied by the number of spatial streams, multiplied by the number of APs. That is, for each subcarrier, the MIMO channel that can be estimated is $N_{RX} \times N_{STS,r} \times N_{AP}$. The $N_{Ap}$ designates the number of APs, the N designates the number of receive (RX) antennas on the STA, and the $N_{STS,r}$ designates the number of spatial streams per AP. For example, if there are two APs each having two antennas having two space-time streams, and the STA has four RX antennas, then the STA may need 4×2×2=16 channel estimations. By enabling the STA to determine the channel estimations of all the streams from all the antennas of all the APs, the STA may be able to receive data using these channel estimations The dimension of the P-matrix may be defined as a 4×4 orthogonal matrix because in this example, AP1 and AP2 are shown to have two antennas each transmitting to four antennas on the STA. In this scenario, the P-matrix will orthogonalize four transmissions from the APs to the STA. It should be understood that forming a 4×4 matrix is just an example, and the idea is not limited to this as devices can have more antennas, for example 4×8 or even 8×10 (STAs usually do not have many antennas).

The elements of the P-matrix may be as follows:

$$\begin{bmatrix} P_{11} & P_{12} & P_{13} & P_{14} \\ P_{21} & P_{22} & P_{23} & P_{24} \\ P_{31} & P_{32} & P_{33} & P_{34} \\ P_{41} & P_{42} & P_{43} & P_{44} \end{bmatrix}$$

To generalize, a P-matrix may have a size of M×N, where M may designate the number of antennas on the STA side and N is the number of antennas on the AP side or vice versa. In the example of FIG. 3, the P-matrix has 16 elements because there is a total of four antennas on the APs. That is, antenna 1 of $AP_1$ transmits to four antennas on the STA, antenna 2 of $AP_1$ transmits to the four antennas on the STA, antenna 1 of $AP_2$ transmits to the four antennas on the STA, and antenna 2 of $AP_2$ transmits to the four antennas on the STA. Therefore, the P-matrix will need to have 16 elements in order to provide orthogonality to each of these 16 transmissions.

The cyclic shifts may be designated as $CS_{ij}$ or $CS_{12}$ to provide a cyclic shift between antenna 1 and antenna 2 of $AP_1$, while $CS_{21}$ and $CS_{22}$ provide a cyclic shift between antenna 1 and antenna 2 of $AP_2$. The CS values provide diversity between the fields that are transmitted on each antenna of an AP. In general, $C_{ij}$ is where i is an integer that designates the respective AP, and j is an integer that designates the respective antenna on that respective AP. For example, $C_{11}$ is used for antenna 1 on $AP_1$, while $CS_{12}$ is used for antenna 2 on $AP_1$. Similarly, $CS_{21}$ is used for antenna 1 on $AP_2$, and $CS_{22}$ is used for antenna 2 on $AP_2$. It is understood that the above descriptions are for purposes of illustration and are not meant to be limiting.

Figure 4:
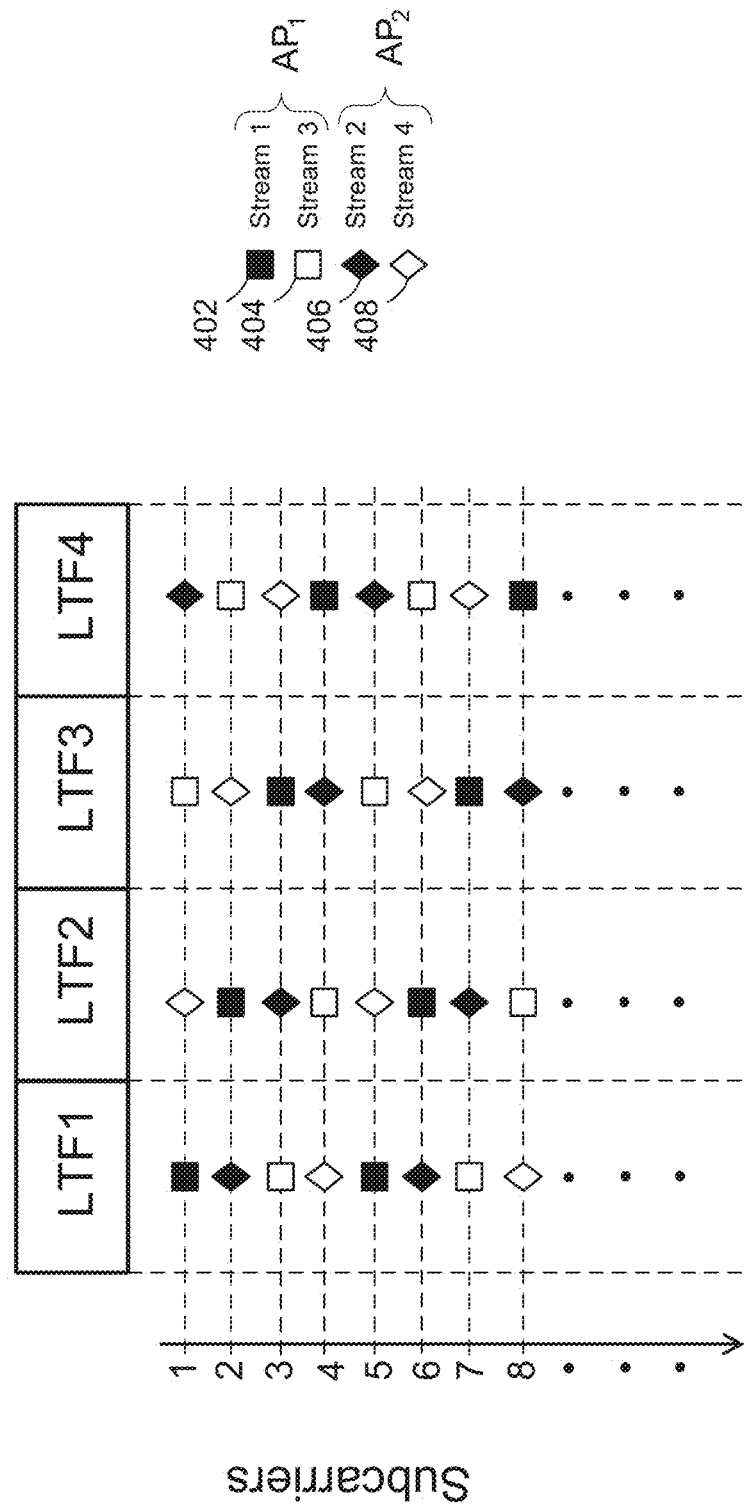
FIG. 4 depicts an illustrative schematic diagram of tone interleaved training fields, in accordance with one or more example embodiments of the present disclosure.

FIG. 4 depicts an illustrative schematic diagram of tone interleaved training fields, in accordance with one or more example embodiments of the present disclosure.

In one embodiment, a channel estimation for a coordinated AP transmissions system may determine an interleaved LTF structure that may provide differentiation between the multiple streams between multiple APs and an STA. In one embodiment, the channel estimation for the coordinated AP transmissions system may separate the long training sequences (LTSs) of the LTF fields in the frequency domain by interleaving the subcarriers on which the LTS is transmitted.

By interleaving LTSs from each AP, the cross stream leakage will not be an issue with relatively small offsets as anticipated in a C-BSS deployment. This method would require interpolation at the STA to obtain channel estimations on the null subcarriers from each AP. Interpolation requires a relatively simple hardware addition in exchange for providing better immunity to frequency offset errors.

Referring to FIG. 4, there is shown $AP_1$ using streams 1 and 3 and $AP_2$ using streams 2 and 4 to communicate with an STA having four antennas. The four LTF fields for transmission of four streams are shown as LTF1, LTF2, LTF3, and LTF4 in FIG. 4. Each of these training fields may be comprised of one or more LTSs (e.g., LTSs 402, 404, 406, and 408), where the one or more LTSs are separated in the frequency domain by interleaving the subcarriers on which the LTS is transmitted. Therefore, each of the LTSs for LTF1 may be transmitted using different subcarriers. In this scenario, the four streams may be differentiated using interleaving, resulting in the ability to transmit these four streams simultaneously from both $AP_1$ and $AP_2$ to the STA. The number of the subcarriers depends on the frequency band used (e.g., 20, 40, 60, 80 MHz, etc.).

Figure 5A:
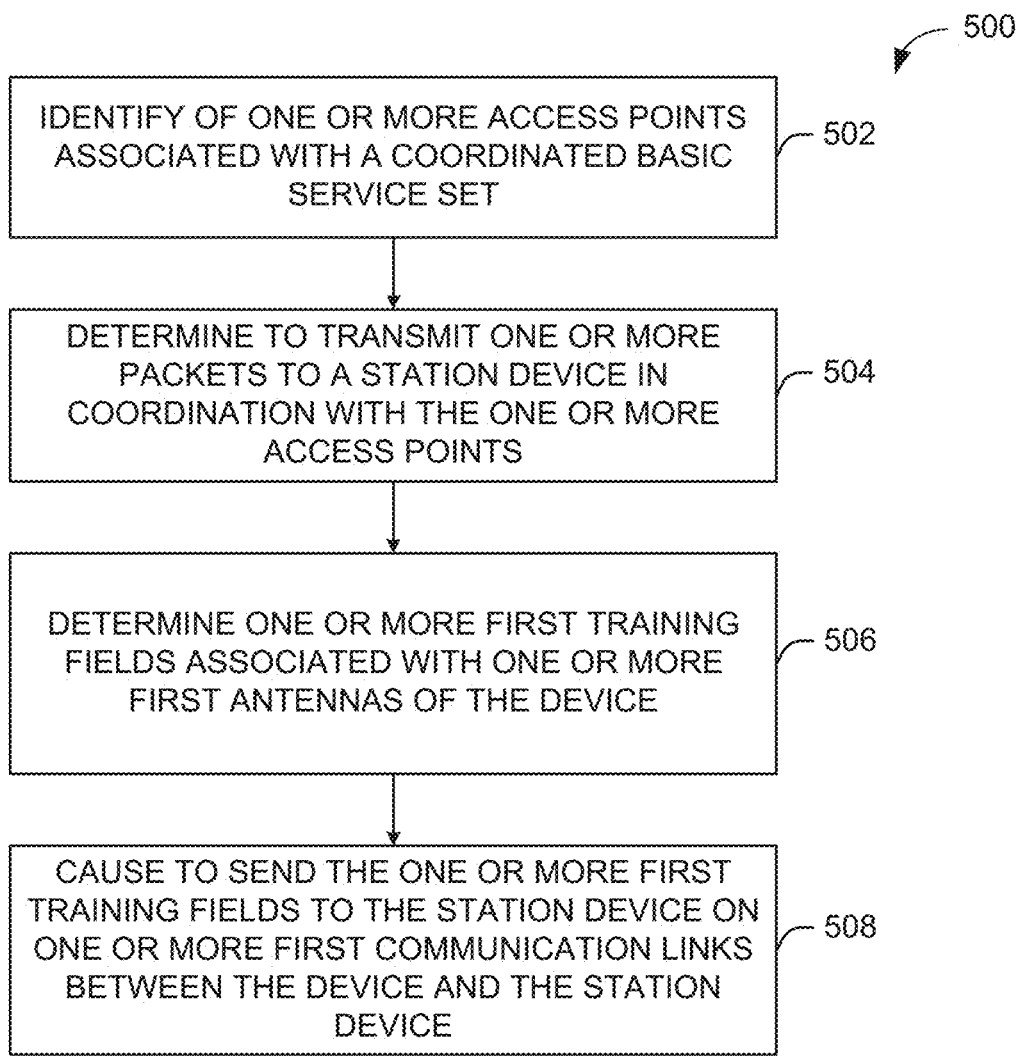
FIG. 5A depicts a flow diagram of an illustrative process for a channel estimation for a coordinated AP transmissions system, in accordance with one or more example embodiments of the present disclosure.

FIG. 5A depicts a flow diagram of an illustrative process for a channel estimation for a coordinated AP transmissions system, in accordance with one or more example embodiments of the present disclosure.

At block 502, a device (e.g., the user device(s) 120 and/or the APs 102 of FIG. 1) may identify of one or more access points (e.g., the AP 103 of FIG. 1) associated with a coordinated basic service set (C-BSS). For example, the device may be an AP belongs to a group of APs that are capable of simultaneously communicating with a user device (e.g., the user device 120 of FIG. 1). That is, the group of APs are able to coordinate, using a controller device, the transmission of one or more data packets to the user device. The C-BSS may provide a range of different techniques that enable the dynamic coordination of transmission and reception over a variety of different APs. In order to achieve that, the APs and the user device have to establish a dynamic physical layer communication between them. In order to do so, channel estimation has to be determined efficiently and accurately in order to separate the signals coming from the various APs to the user device. On the other hand, if channel estimation is not performed, these incoming signals at the user device antennas may be treated as interference or noise.

At block 504, the AP may determine to transmit one or more packets to a user device in coordination with the other APs in the group of APs. For example, the AP may send a packet to the user device, while other APs may also send other packets associated with a communication session with the user device.

At block 506, the AP may determine one or more training fields associated with one or more antennas of the AP. The user device 120 maybe unaware of how spatial streams are coordinated between the various APs. For example, if the user device 120 has four antennas, the user device 120 may only be aware that there are four spatial streams received on these antennas at four time-slots. The APs may determine the training fields in such a way to assist the user device 120 in performing channel estimation such that the user device 120 is able to communicate simultaneously with each of these APs.

At block 508, the AP may send the one or more training fields to the user device 120 using communication links (e.g., spatial streams) with the user device. For example, the AP 102 may determine transmission of one or more spatial streams where one or more training fields are needed to be transmitted to the user device 120. In order to train a communication link between each of the APs antennas with the antennas of the user device 120. In this example, one or more training fields may be determined such that they enable channel estimation when received by the user device 120. That is, the one or more training fields may be needed for one or more spatial streams with different cyclic shifts in order to differentiate at the user device 120. Cyclic shift is added to allow simultaneous transmission from, for example, two antenna at one AP. It will appear as if there has been different multipath at the user device, which will be equalized as part of equalization.

The AP may determine AP 103 may determine an orthogonal matrix, such as a P-matrix having multiple elements. The AP 103 may then multiply each of the one or more training fields associated with the one or more spatial streams of the AP 103 with a corresponding element from the P-matrix. For example, if the AP 103 has two antennas and the user device 120, has four antennas, the AP 103 may determine a P-matrix based on whether to use a time domain separation or code domain separation between training fields from the AP 103 and any other APs that may be part of the C-BSS responsible for jointly transmitting to the user device 120.

A controller device may coordinate the communications between the various APs and the user device 120. For example, the BC 140 may dynamically coordinate the transmission and reception of data between the various APs (e.g., APs 102 of FIG. 1) with the user device 120. The BC 140 may enable the AP 103 and the AP 105 to complete a simultaneous communication with the user device 120. The BC 140 may operate in the background and may be transparent to the user device 120. The BC 140 may determine which AP may cooperate with another AP to complete the simultaneous transmissions to the user device 120. This may be based on network information that may include the SNR and/or RSSI determination between the user device 120 and the one or more APs, and the channel state information between users and APs. If it is determined that the SNR and/or the RSSI falls below a certain threshold or the wireless channel is such that joint transmission would cause a lot of interference, the AP may not be selected to part of the cooperative transmission to the user device 120. The network information may be received from each of the APs. The network information associated with each AP may then be compared to determine the AP(s) that may best service the user device 120. The comparison may be made at the user device 120, at the BC 140, or even at the APs themselves. After comparison of the network information from all the APs in proximity to the user device 120, a selection of one or more APs may be made by any of the user device 120, the BC 140, or the APs in order to participate in the cooperative transmission to the user device 120. For example, the AP 103 and AP 105 may be selected to be cooperatively and/or jointly transmitting data to the user device. If the network information associated with the third AP falls below an acceptable or predetermined threshold. However, it should be understood that although AP 103 and AP 105 have been selected, the selection may be changed in time because the conditions may vary based on time, conditions, network load, user device 120 location, or any other factors that may degrade SNR and/or the RSSI and/or wireless channel conditions. Alternatively, and/or additionally, if the network information associated with more than two APs falls above a threshold, indicating good network conditions, the more than two APs may cooperate or otherwise jointly transmit data to the user device 120. It is understood that the above descriptions are for purposes of illustration and are not meant to be limiting.

Figure 5B:
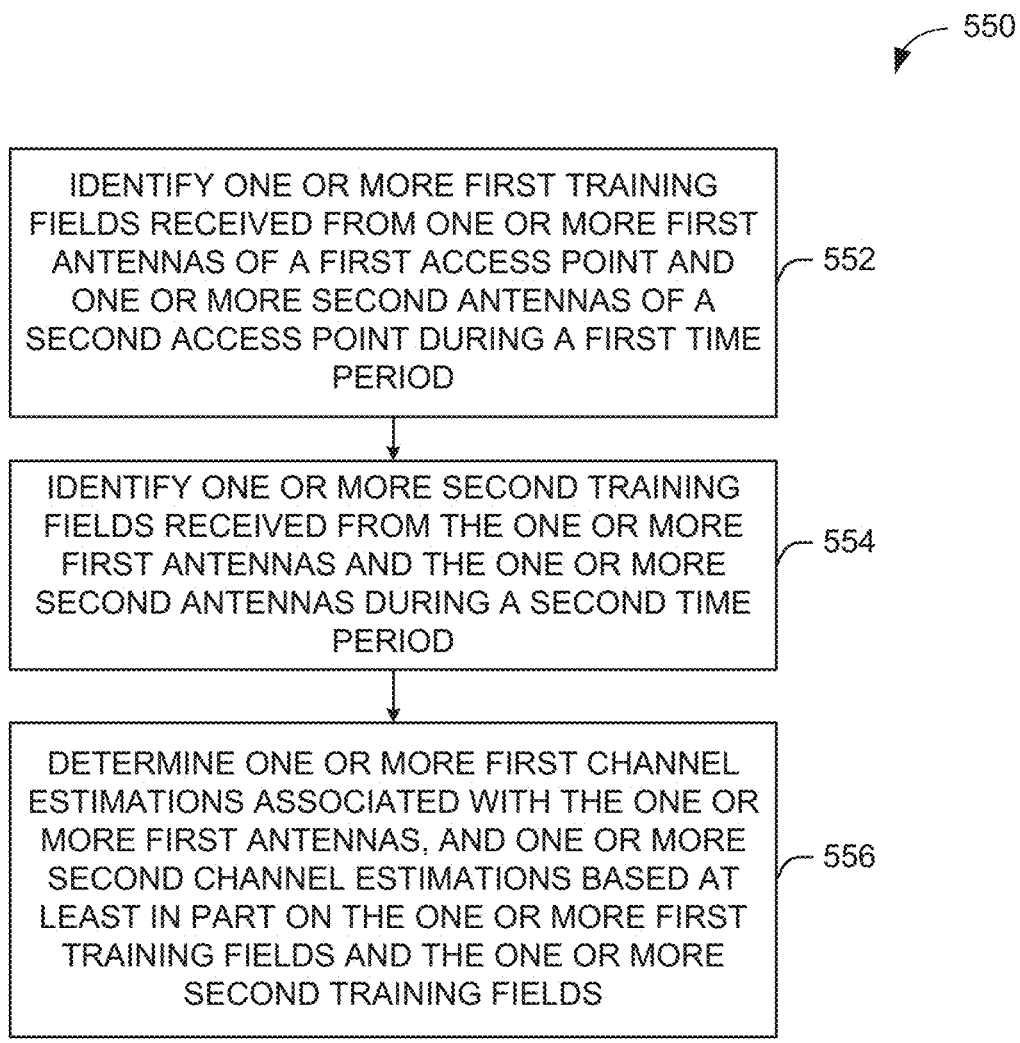
FIG. 5B depicts a flow diagram of an illustrative process for a channel estimation for a coordinated AP transmissions system, in accordance with one or more example embodiments of the present disclosure.

FIG. 5B illustrates a flow diagram of illustrative process 550 for a channel estimation for coordinated AP transmissions system, in accordance with one or more example embodiments of the present disclosure.

At block 552, a device (e.g., the user device(s) 120 and/or the APs 102 of FIG. 1) may identify one or more first training fields received from one or more first antennas of a first access point and one or more second antennas of a second access point during a first time period. For example, a user device 120 may simultaneously receive training fields from multiple APs (e.g., AP 103 and AP 105 of FIG. 1). Typically, a user device establishes a physical layer connection with only one AP at a time. That is, the user device is able to communicate with only one AP at a time for a particular communication session. However, a channel estimation for coordinated AP transmissions system may facilitate simultaneous communication between a user device and the multiple APs. In order to do so, channel state may have to be estimated for each of the physical layer connections with the multiple APs. That is, the user device 120 may need to obtain channel estimations of the physical layer connection with the AP 103 and with the AP 105. For example, the user device 120 may receive training fields from the AP 103. In order for the device to be able to communicate with multiple APs, the APs may be part of a C-BSS, which may be defined as a set of managed BSS networks. A managed BSS network refers to a deployment scenario in a large area such enterprise, school campus, hotel, airport, stadium, etc., where several APs form an ESS using the same SSID, and have either a centralized or distributed control layer among them.

At block 554, the device may identify one or more second training fields received from the one or more first antennas and the one or more second antennas during a second time period. For example, the user device 120 may receive training fields from another AP, e.g., AP 105, in addition to training fields from AP 103. The AP 103 and the AP 105 may be connected to a controller device (e.g., BC 140 of FIG. 1) that coordinates packet exchanges between the AP 103, the AP 105, and the user device 120. The user device 120 maybe unaware of how streams are coordinated between the AP 103 and AP 102. For example, if the user device 120 has four antennas, the user device 120 may only be aware that there are four streams received on these antennas at four timeslots. The user device 120 may estimate a channel matrix 4×4 and may decode data that is associated with the four streams. In general, the user device 120 is aware of number of spatial streams being transmitted to may not be aware of the number of antennas at the APs. For example, to gain diversity, an AP may transmit two streams using two or more transmit antenna. The user device may need to have a minimum of two antennas to receive the two streams. At block 556, the device may determine one or more first channel estimations associated with the one or more first antennas, and one or more second channel estimations based at least in part on the one or more first training fields and the one or more second training fields.

Continuing with the above example, the user device 120 may receive training fields from more than two APs. Each AP, similar to The AP 105 may include one or more antennas. In an example, assume that AP 105 includes two antennas (antenna 1 and antenna 2). The user device 120 may need to establish a PHY connection with each of AP 103 and AP 105 within the C-BSS. In that case, AP 103 and AP 105 may jointly transmit a MIMO packet to the device. That is, if the device is within the coverage areas of AP 103 and AP 105, AP 103 and AP 105 may jointly transmit data to the STA. Depending on the scenario (network load, transmission scheme, STA location, etc.), the STA may need to obtain channel state information for each link to each AP in order to receive data reliably from each communication link. Further, the one or more training fields from AP 103 and AP 105 may be differentiated from each other using a code domain and/or a time domain separation. In order to do so, the one or more training fields may be operated on using an orthogonal matrix, such as the P-matrix. The P-matrix may have multiple elements that when multiplied with the training fields, cause the training fields to be orthogonal to each other. This may result in the training fields being separated and enable channel estimation when received at the user device 120. Further, cyclic shift diversity may be used in order to cause more differentiation between the one or more training fields transmissions of the antennas of AP 103 and AP 104. Therefore, each training field may include differentiating factors such as multiplication with a P-matrix element and cyclic shift diversity between each antenna of each AP. Similarly, interleaving may be used to separate long training fields in frequency domain.

If time domain differentiation is adopted (see, e.g., FIG. 2), the AP 103 may transmit its training fields from antenna 1 and antenna 2 to the user device 120 during a first timeslot, and the AP 105 may transmit its training fields from antenna 1 and antenna 2 to the user device 120 during a second timeslot. That is, the streams coming from AP 103 are not overlapping the streams coming from AP 105. To be specific, assume that a cyclic shift of $CS_{ii}$ indicates a cyclic shift associated with AP 103 and its antenna 1 and a cyclic shift of $CS_{12}$ indicates a cyclic shift associated with AP 103 and its antenna 2. A 2×2 P-matrix may be used in order to differentiate the training fields between the two streams of each AP. For example, in the case of AP 103, the training field transmitted for stream 1 of AP 103 to the antennas of the user device 120 may be multiplied by a first element of the P-matrix (e.g., $P_{ii}$). Similarly, the training field transmitted for stream 2 of AP 103 to the antennas of the user device 120 may be multiplied by a second element of the P-matrix (e.g., $P_{21}$). Therefore, the two spatial streams from antennas of AP 103 to the antennas of the user device 120 may be separated using the P-matrix. The same is true for $2^{nd}$ time slot transmission of AP 103. That is, the training field transmitted for stream 1 and 2 of AP 103 to antenna of the user device 120 at the $2^{nd}$ timeslot may be multiplied by a third element of the P-matrix (e.g., $P_{21}$ and by a fourth element of the P-matrix (e.g., $P_{22}$). This may also result in two spatial streams from AP 103 to the antennas of the user device 120. Similarly, the training fields transmission from AP 105 to the antennas of the user device 120 may use a second 2×2 P-matrix (or the same P-matrix used by AP 103) an applying a cyclic shift in the second timeslot as shown in FIG. 2.

In other examples, code differentiation may be used (see, e.g., FIG. 3). In this case, the AP 103 may transmit its training fields from antenna 1 and antenna 2 to the first, second, third, and fourth antenna of the user device 120 during a first timeslot, and the AP 105 may transmit its training fields from antenna 1 and antenna 2 to the first, second, third, and fourth antenna of the user device 120 during the same timeslot. Therefore, there will be 4 streams coming from the AP 103 and AP 105 to each of the four antennas of the user device 120 (two streams from each AP to the user device 120). Consequently, a 4×4 P-matrix may be used to differentiate between the 16 elements of the channel matrix. It should be understood that forming a 4×4 matrix is just an example, and the idea is not limited to this as devices can have more antennas, for example 4×8 or even 8×10 (STAs usually do not have many antennas).

The APs may provide the user device 120 with the P matrices used in either the time domain differentiation or the code domain differentiation. Further, the APs may provide the user device with information related to the cyclic shift applied for each of the training fields. Having that information, the user device 120 may be able to construct or otherwise generate an overlay matrix of training fields in order to enable channel estimation at the user device 120. Channel estimation allows the user device 120 to coherently detect transmitted information between the user device 120, the AP 103 and the AP 105.

Channel estimation allows the user device 120 to coherently detect transmitted information between the user device 120, the AP 103 and the AP 105. It is noted that pilots subcarriers can be multiplied to the P-matrix or a different matrix to allow the receiver (e.g., the user device 120) to track phase and frequency offset during MIMO channel estimation. Additionally, the pilots could have the P-Matrix overlay removed for those subcarriers.

The data transmission between the user device 120 and both the AP 103 and the AP 105 may be simultaneously done. For example, the user device 120 may be communicating with both AP 103 and AP 105 because it is enabled to perform channel estimation of each of the APs based on the differentiated training fields received from the APs. Interference may be minimized between the different connections and between the user devices and the APs 103 and 105 in the main controller of the backhaul. In some embodiments, since the environment is an OFDM environment, each subcarrier may be estimated separately. For each subcarrier, the receiver (e.g., user device 120) may need to estimate a number of channel state information equal to the number of RX antennas of the receiver multiplied by the number of spatial streams multiplied by the number of APs. Although this example is showing APs with two antennas and a user device 120 with four antennas, it should be understood that this is only for purposes of illustration and are not meant to be limiting. For example, other number of antennas per AP may be envisioned and other number of antennas per user device may also be envisioned. The application of the P-matrix may be adapted to cover the number of possible spatial streams that may be established between the antennas of the APs and the antennas of the user device.

In some embodiments, the user device 120 may be in proximity to other APs. In this case, the C-BSS may manage the inter-BSS transmissions in order to determine the APs that may cooperate in order to simultaneously communicate with the user device 120. For example, if a third AP is at a boundary of the C-BSS such that performance is degraded, the BC 140 of FIG. 1 and/or user device 120 and/or the other APs within the C-BSS may determine the APs that may best service the user device 120. In order to do so, the BC 140 and/or user device 120 and/or the other APs may determine information from each of the APs in order to determine whether they can coordinate to simultaneously communicate with the user device 120. The information may be network information associated with the APs. The network information may include For example, a signal to noise ratio (SNR) and a received signal strength indicator (RSSI) between a user device 120 and an AP. If it is determined that the SNR and/or the RSSI falls below a certain threshold, the AP may not be selected to part of the cooperative transmission to the user device 120. The network information may be received from each of the APs. The network information associated with each AP may then be compared to determine the AP(s) that may best service the user device 120. The comparison may be made at the user device 120, at the BC 140, or even at the APs themselves. After comparison of the network information from all the APs in proximity to the user device 120, a selection of one or more APs may be made by any of the user device 120, the BC 140, or the APs in order to participate in the cooperative transmission to the user device 120. For example, the AP 103 and AP 105 may be selected to be cooperatively and/or jointly transmitting data to the user device. If the network information associated with the third AP falls below an acceptable or predetermined threshold. However, it should be understood that although AP 103 and AP 105 have been selected, the selection may be changed in time because the conditions may vary based on time, conditions, network load, user device 120 location, or any other factors that may degrade SNR and/or the RSSI. Alternatively, and/or additionally, if the network information associated with more than two APs falls above a threshold, indicating good network conditions, the more than two APs may cooperate or otherwise jointly transmit data to the user device 120.

FIG. 6 shows a functional diagram of an exemplary communication station 600 in accordance with some embodiments. In one embodiment, FIG. 6 illustrates a functional block diagram of a communication station that may be suitable for use as an AP(s) 102 (FIG. 1) or a user device 120 (FIG. 1) in accordance with some embodiments. The communication station 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 600 may include communications circuitry 602 and a transceiver 610 for transmitting and receiving signals to and from other communication stations using one or more antennas 601. The communications circuitry 602 may include circuitry that can operate the physical layer (PHY) communications and/or media access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in FIGS. 2, 3, 4, 5A and 5B.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory.

FIG. 7 illustrates a block diagram of an example of a machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker), a channel estimation for coordinated AP transmissions device 719, a network interface device/transceiver 720 coupled to antenna(s) 730, and one or more sensors 728, such as a global positioning system (GPS) sensor, a compass, an accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The channel estimation for coordinated AP transmissions device 719 may carry out or perform any of the operations and processes (e.g., processes 500 and 550) described and shown above. For example, the channel estimation for coordinated AP transmissions device 719 may be configured to facilitate an STA to stagger the communications and separate them in time, frequency, and code in order for the STA to be able to simultaneously communicate with multiple APs at a time.

The channel estimation for coordinated AP transmissions device 719 may provide a range of different techniques that enable the dynamic coordination of transmission and reception over a variety of different APs.

The channel estimation for coordinated AP transmissions device 719 may obtain channel state estimations of the different transmission links required to enable C-BSS with multiple APs. In that case, APs may jointly transmit a MIMO packet to an STA. In order to do so, the STA may obtain a channel matrix of all the corresponding links with the various APs within the C-BSS. For example, if an STA is within coverage areas of multiple APs, these APs may jointly transmit data to the STA. Depending on the scenario (network load, transmission scheme, STA location, etc.), the STA may need to obtain channel state information for each link to each AP in order to receive information reliably.

The channel estimation for coordinated AP transmissions device 719 may use a central or distributed backhaul controller, which enables the exchange of information among each AP in the network related to its management, control and data plans.

The channel estimation for coordinated AP transmissions device 719 may determine long training fields (LTFs), which may be orthogonal to other LTF's from different APs during a cooperative transmission. This may allow a STA to perform channel state estimation for all spatial streams. An LTF may be a field utilized for channel estimation, channel training, channel characterization and other functions needed for establishing a channel between a transmitting device and a receiving device. The format of an LTF may depend on the communication network and devices used in a network. For example, in a UL MU-MIMO, a specific LTF sequence may be adopted such that receiving devices are able to be trained using this LTF sequence. In another example for DL-C-BSS transmission, another LTF sequence may be used by APs. Channel estimation provides channel state information (CSI) at the receiving device (e.g., STA) for coherent detection of the transmitted information in wireless communication systems. CSI refers to known channel properties of a communication link. This information describes how a signal propagates from the transmitting device to the receiving device and represents the combined effect of, for example, scattering, fading, and power decay with distance, and delay spread and multipath characteristics of the channel. The CSI can make it possible to adapt transmissions to current channel conditions.

The channel estimation for coordinated AP transmissions device 719 may use an overlay matrix in order to enable channel estimation at the STA. The use of an overlay matrix may have the advantage of simplifying hardware architecture and implementation through reuse.

Alternatively, the channel estimation for coordinated AP transmissions device 719 may interleave LTFs in the frequency domain.

The channel estimation for coordinated AP transmissions device 719 may be compatible with IEEE 802.11 packet format and may allow the reuse of 802.11 hardware architecture resulting in lower complexity in manufacturing new devices.

It is understood that the above are only a subset of what the channel estimation for coordinated AP transmissions device 719 may be configured to perform and that other functions included throughout this disclosure may also be performed by the channel estimation for coordinated AP transmissions device 719.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a single input single output (SISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

According to example embodiments of the disclosure, there may be a device. The device may include memory and processing circuitry configured to identify of one or more access points associated with a coordinated basic service set. The memory and processing circuitry may be further configured to determine to transmit one or more packets to a station device in coordination with the one or more access points. The memory and processing circuitry may be further configured to determine one or more first training fields associated with one or more antennas of the device. The memory and processing circuitry may be further configured to cause to send the one or more first training fields to the station device on one or more first communication links between the device and the station device.

The implementations may include one or more of the following features. The memory and the processing circuitry are further configured to identify an orthogonal matrix having one or more elements, wherein the orthogonal matrix is same at the device, the one or more access points, and a controller device. Each of the one or more training fields is multiplied by a corresponding element of the orthogonal matrix. A size of the orthogonal matrix is based at least in part on a number of second devices and a number of antennas associated with each device in the coordinated basic service set group. The memory and the processing circuitry are further configured to cause to transmit a first training field and a second training field on a first antenna of the one or more antennas of the device. The memory and processing circuitry may be further configured to cause to transmit a third training field and a fourth training field on a second antenna of the one or more antennas of the device. At least one of the one or more training fields associated with the device are received by the station device in combination with one or more second training fields associated with at least one of the one or more access points. Each of the one or more training fields is associated with a cyclic shift. The one or more training fields comprise one or more training sequences, wherein the one or more training sequences are interleaved in frequency domain. The device may further include a transceiver configured to transmit and receive wireless signals. The device may further include one or more antennas coupled to the transceiver.

According to example embodiments of the disclosure, there may be a non-transitory computer-readable medium storing computer-executable instructions which, when executed by a processor, cause the processor to perform operations. The operations may include identifying, by one or more processors, a coordinated group one or more access points associated with a coordinated basic service set. The operations may include determining to coordinate with the coordinated group a joint transmission of one or more packets to a station device. The operations may include determining one or more first training fields associated with one or more antennas of the device. The operations may include causing to send the one or more first training fields to the station device on one or more first communication links between the device and the station device.

The implementations may include one or more of the following features. The operations may include identifying an orthogonal matrix having one or more elements, wherein the orthogonal matrix is the same at the device, the one or more access points, and a controller device. Each of the one or more training fields is multiplied by a corresponding element of the orthogonal matrix. The one or more training fields comprise one or more training sequences, wherein the one or more training sequences are interleaved in frequency domain. A size of the orthogonal matrix is based at least in part on a number of second devices and a number of antennas associated with each device in the coordinated basic service set group. The operations may include causing to transmit a first training field and a second training field on a first antenna of the one or more antennas of the device. The operations may include causing to transmit a third training field and a fourth training field on a second antenna of the one or more antennas of the device. At least one of the one or more training fields associated with the device are received by the station device in combination with one or more second training fields associated with at least one of the one or more access points. Each of the one or more training fields is associated with a cyclic shift.

In example embodiments of the disclosure, there may be an apparatus. The apparatus may include means for identifying, by one or more processors, a coordinated group one or more access points associated with a coordinated basic service set. The apparatus may include means for determining to coordinate with the coordinated group a joint transmission of one or more packets to a station device. The apparatus may include means for determining one or more first training fields associated with one or more antennas of the device. The apparatus may include means for causing to send the one or more first training fields to the station device on one or more first communication links between the device and the station device.

The implementations may include one or more of the following features. The apparatus may further include means for identifying an orthogonal matrix having one or more elements, wherein the orthogonal matrix is the same at the device, the one or more access points, and a controller device. Each of the one or more training fields is multiplied by a corresponding element of the orthogonal matrix. The one or more training fields comprise one or more training sequences, wherein the one or more training sequences are interleaved in frequency domain. A size of the orthogonal matrix is based at least in part on a number of second devices and a number of antennas associated with each device in the coordinated basic service set group. The apparatus may further include means for causing to transmit a first training field and a second training field on a first antenna of the one or more antennas of the device. The apparatus may include means for causing to transmit a third training field and a fourth training field on a second antenna of the one or more antennas of the device. At least one of the one or more training fields associated with the device are received by the station device in combination with one or more second training fields associated with at least one of the one or more access points. Each of the one or more training fields is associated with a cyclic shift.

According to example embodiments of the disclosure, there may include a method. The method may include identifying one or more first training fields received from one or more antennas of a first access point and one or more second antennas of a second access point during a first time period. The method may include identifying one or more second training fields received from the one or more antennas and the one or more second antennas during a second time period. The method may include determining one or more first channel estimations associated with the one or more antennas, and one or more second channel estimations based at least in part on the one or more first training fields and the one or more second training fields.

The implementations may include one or more of the following features. The method may further include determining the one or more first training fields and the one or more second training fields are based at least in part on an orthogonal matrix and one or more cyclic shifts. Each of the one or more first training fields is multiplied by a corresponding element of the orthogonal matrix. The one or more first training fields comprise one or more first training sequences, and wherein the one or more second training fields comprise one or more second training sequences. The one or more first training sequences and the one or more second training sequences are interleaved in frequency domain. A first training field of the one or more first training fields comprises a first cyclic shift and a second training field of the one or more first training fields comprises a second cyclic shift. The first access point and the second access point are connected to a controller device that coordinates packet exchanges between the first access point, the second access point, and the device.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A station device, the station device comprising: memory and processing circuitry, configured to:
    identify one or more first training fields received from one or more antennas of a first access point and one or more second antennas of a second access point during a first time period;
    identify one or more second training fields received from the one or more antennas and the one or more second antennas during a second time period, wherein the first access point and second access point are associated with a channel matrix maintained by the station device, the channel matrix comprising a first link corresponding to the first access point and a second link corresponding to the second access point;
    determine the one or more first training fields and the one or more second training fields are based at least in part on an orthogonal matrix and one or more cyclic shifts; and
    determine one or more first channel estimations associated with the one or more antennas, and one or more second channel estimations based at least in part on the one or more first training fields and the one or more second training fields.

2. The station device of claim 1, wherein each of the one or more first training fields is multiplied by a corresponding element of the orthogonal matrix.

3. The station device of claim 1, wherein the one or more first training fields comprise one or more first training sequences, and wherein the one or more second training fields comprise one or more second training sequences.

4. The station device of claim 3, wherein the one or more first training sequences and the one or more second training sequences are interleaved in frequency domain.

5. The station device of claim 1, wherein a first training field of the one or more first training fields comprises a first cyclic shift and a second training field of the one or more first training fields comprises a second cyclic shift.

6. The station device of claim 1, wherein the first access point and the second access point are connected to a controller device that coordinates packet exchanges between the first access point, the second access point, and the device.

* * * * *